Dec. 31, 1968     B. BARISH ET AL     3,418,805
PULSED FUEL DELIVERY SYSTEM FOR TURBINE POWER PACKAGE
Filed May 10, 1965     Sheet 1 of 4
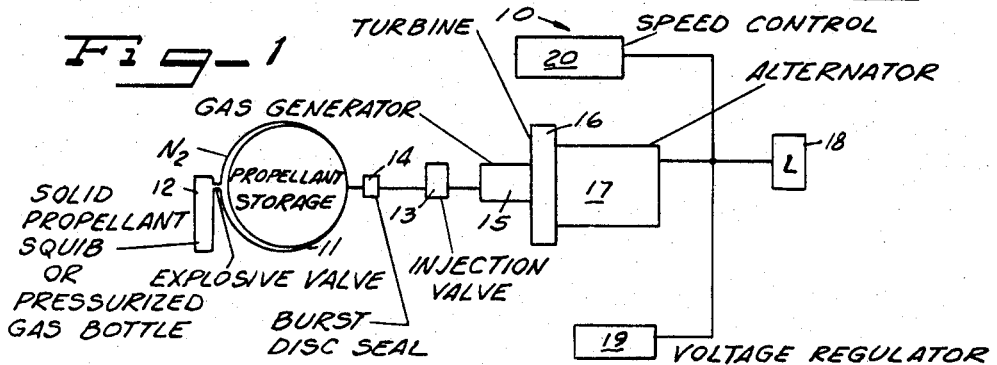
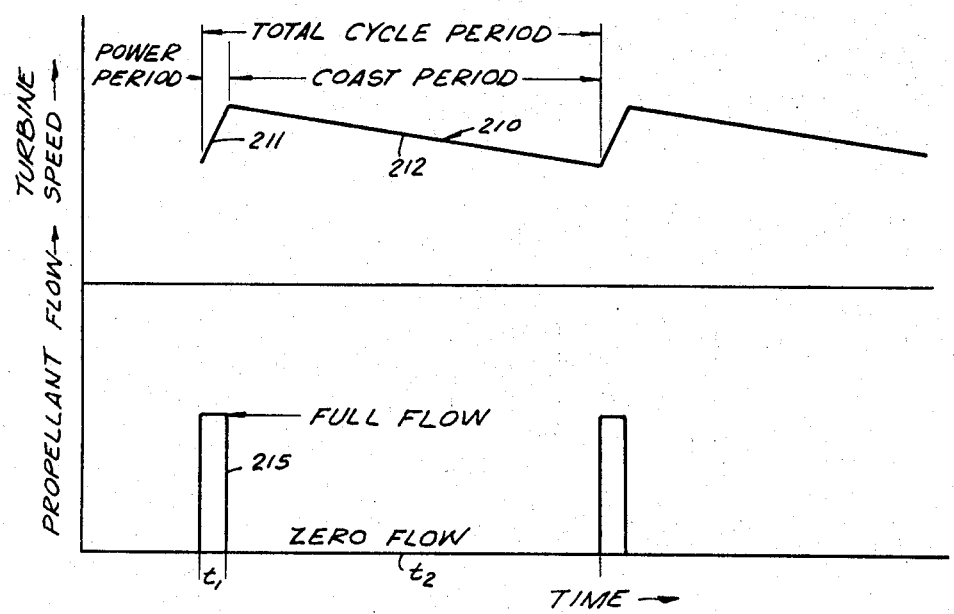
INVENTORS
BENJAMIN BARISH
ARTHUR R. THOMSON
BY Hill, Sherman, Meroni, Gross & Simpson
ATTORNEYS Dec. 31, 1968      B. BARISH ET AL      3,418,805
PULSED FUEL DELIVERY SYSTEM FOR TURBINE POWER PACKAGE
Filed May 10, 1965      Sheet 2 of 4

INVENTORS
BENJAMIN BARISH
ARTHUR R. THOMSON

BY  Hill, Sherman, Meroni, Gross & Simpson
ATTORNEYS

United States Patent Office 3,418,805
Patented Dec. 31, 1968

3,418,805
PULSED FUEL DELIVERY SYSTEM FOR TURBINE POWER PACKAGE
Benjamin Barish, Shaker Heights, and Arthur R. Thomson, Cleveland Heights, Ohio, assignors to TRW Inc., a corporation of Ohio
Filed May 10, 1965, Ser. No. 454,439
4 Claims. (Cl. 60—39.28)

ABSTRACT OF THE DISCLOSURE

The invention is directed to a power control system for cyclically applying combustible gases to a turbine which, in turn, controls the operation of an alternating current voltage generator or the like. A control system includes a valve which is turned sequentially on and off in response to the speed of the generator.

---

This invention relates to power systems which are driven by turbines energized by controlled pulses of gas flow from a fuel fed gas generator which is controlled by the output of the system. Specifically this invention relates to a turboelectric generator package having an off-on hot gas source for the turbine which is controlled by generated electric current to maintain the turbine speed and power within a predetermined range.

The invention will be hereinafter specifically described as embodied in a turbine driven alternator package with a self-contained mono- or bipropellant hot gas generating source controlled by the output voltage and/or frequency of the alternator to drive the turbine by pulses of hot gas. However, it should be understood that the power systems of this invention are not limited to systems for generating electrical current since mechanical and other forms of power can be delivered by the devices of this invention.

According to this invention a turbine driven power package is provided which includes self-contained hot gas generating means which are cycled to drive the turbine through short hot gas power periods alternating with longer coast periods thereby increasing the operating life of the package while simultaneously decreasing the operating temperature of the package. The devices of this invention utilize high energy fuels capable of being stored for long periods of time and triggered for instantaneous use upon initiation of a start signal to thereafter operate in a completely automatic manner. Because the hot gases are used as soon as they are generated and because the generation of the gases is cycled under the control of the power demands of the system, the devices of this invention are highly efficient and can be quite compact and light in weight. At their rated power outputs, the packages of this invention are driven through relatively short pulse gas generating periods alternating with relatively long coast periods. Heretofore turbine driven alternator systems were constantly driven and had to use low energy fuels to withstand the high gas temperatures of the fuels. Attempts to increase the output of such systems have resulted in larger, heavier and more cumbersome packages with complicated fuel injection devices and throttling mechanisms. The high energy fuels used to activate the systems of this invention, while having very high burning temperatures, do not overheat the turbines or other gas handling devices because these devices have long cooling periods between the periods in which the hot gases must be handled.

It is then an object of this invention to provide a compact efficient turbine driven power package energized by controlled pulses of hot gases generated from high energy fuels contained in the package.

Another object of this invention is to provide a turbo alternator package with a self-contained hot gas generator actuated to product pulses of hot gas under the control of the power demands of the system.

A further object of this invention is to provide a turbine driven power package with an on-off hot gas generating system triggered by the power demands on the system to drive the turbine.

Another object of this invention is to provide a self-contained turbine alternator power package which can be stored in a quiescent state for long periods of time, triggered for instant use, and intermittently energized between relatively short duration power periods and long duration coast periods effective to maintain relatively low hardware temperatures while utilizing high temperature gases from high energy fuels.

A feature of the present invention relates to a turbo alternator unit wherein the alternator rotor and the turbine wheel are directly coupled and are supported on common bearings.

Another object of this invention is to provide a hot gas turbine operating at gas temperatures greatly in excess of the allowable operating temperatures of the metal parts by virtue of the short hot gas pulses, followed by long coast periods during which heat is radiated to the environment.

Another object of this invention is to provide a hot gas turbine operating at the high efficiencies associated with turbines of substantially higher power levels by virtue of the high power level used during the hot gas pulse period compared to the average output power of the alternator or other output device.

Another and specific object of this invention is to provide a compact lightweight self-contained power package having mono or bipropellant storage tanks, a turbine driven by hot gases generated from such fuel, an alternator driven by the turbine, and mechanism controlled by the voltage or frequency of the alternator to cycle gas generation from said fuel in an on-off manner for alternate driving and coasting of the turbine under the control of the output demands on the package.

Other and further objects of this invention will be apparent to those skilled in this art from the following detailed description of the annexed sheets of drawings in which:

FIGURE 1 is a schematic diagram of an alternator system according to this invention.

FIGURE 6 is a chart illustrating the cycle of operation of the turbines of the system of this invention.

As shown on the drawings:

Figure 2:
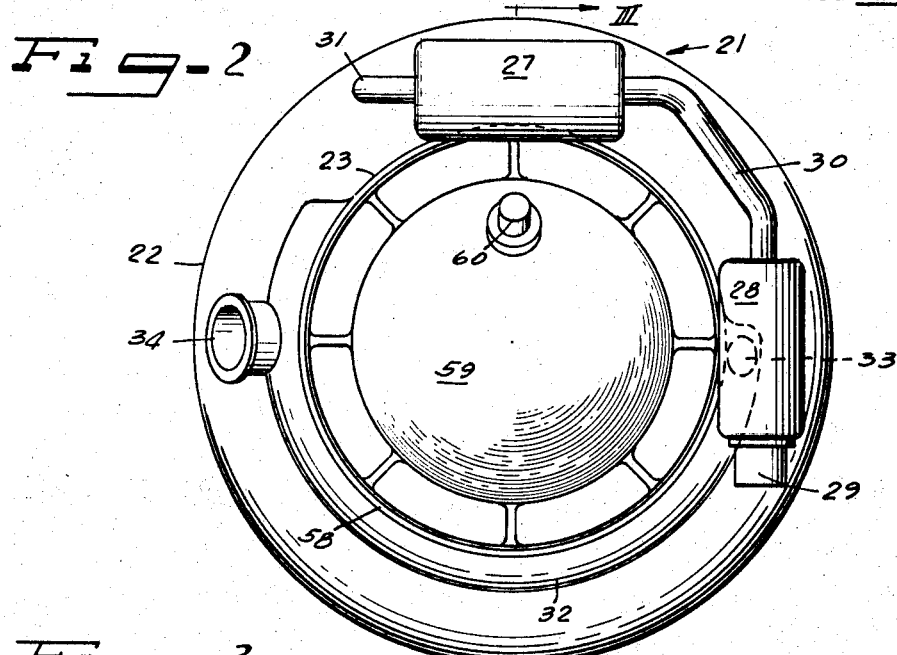
FIGURE 2 is an end elevational view of a turbine alternator package constructed in accordance with the principles of this invention.

In FIG. 1 the reference numeral 10 designates generally an alternator system or assembly according to this invention. The system 10 includes a housing 11 for high energy propellant storage. Both monopropellants and bipropellants are useful. A suitable monopropellant is hydrazine. Suitable bipropellants are unsymmetrical dimethyl hydrazine fuel with an oxidizer such as nitrogen tetroxide or hydrogen as a fuel with oxygen as an oxidizer.

The housing 11 is pressurized by a squib 12 which can be a solid propellant which when fired will allow nitrogen or other stored pressurizing gas into the chamber 11 to eject the propellant therefrom. The propellant feed is controlled by an injection valve 13, and a seal 14 is provided in advance of the injection valve for sealing the propellant in the chamber until such time as the squib is energized whereupon the seal 14 will be ruptured to allow propellant to flow to the injection valve 13. The valve 13 controls propellant flow to a gas generator 15 which burns or decomposes the propellant and feeds the resulting high energy gas to a turbine 16. The turbine 16 is directly coupled to an alternator 17.

The alternator 17 supplies current through leads to a load 18. A voltage regulator 19 in circuit with the alternator stator maintains the voltage delivery of the alternator within a predetermined range. A speed control device senses the alternator frequency and operates the injection valve in an on-off manner to control the driving of the turbine 16 thereby keeping the turbine speed within a predetermined rotational speed range and cycling the driving periods of the turbine in accordance with the load demand on the alternator.

Figure 3:
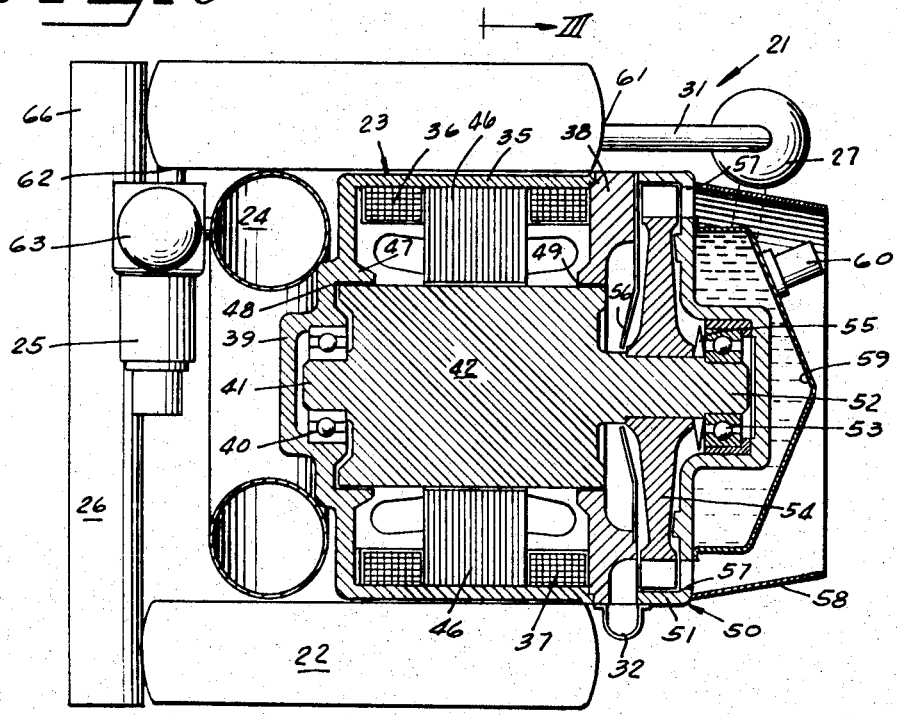
FIGURE 3 is a cross sectional view taken substantially along the line III—III of FIG. 2 with parts in elevation.

The system 10 may take the form of a unit package 21 as shown in FIGS. 2 and 3. This package is generally cylindrical with an annular housing 22 for monopropellant fuel such as hydrazine. The tank 22 may be cylindrical, as well as annular, as required by the installation or available space.

A generally cylindrical turbine and alternator unit 23 is partially telescoped within the tank 22 and the turbine portion of this unit projects from one end of the tank. A donut-shaped pressurization tank 24 is nested within the fuel tank 22 behind the alternator unit 23 for housing pressurizing gas such as nitrogen to load the propellant in the tank 22 when released. A gas regulating and sealing valve 25 receives nitrogen from the tank 24 for delivery to the propellant tank 22 when open. The valve 25 is of the rupturing type when energized and remains open after rupture. An electronic package 26 backs up the tank 22 and houses the voltage regulator, speed control device, and other electrical controls for the unit. The arrangement of components may be varied to best package into the available space and is not restricted to the arrangement described herein.

Propellant from the tank 22 is fed under the control of a solenoid actuated valve 27 to a gas generator 28 thereupon the propellant is decomposed and the hot gas therefrom delivered to the turbine inlet. The gas generator 28 is equipped with an igniter 29 to fire the propellant for the initial pulse. Pulses following the first are decomposed by the residual heat in the gas generator hot spot.

The gas generator 28 is connected to the solenoid valve 27 by means of a fuel line 30. A check valve may be provided in line 30 to prevent hot gases in the gas generator 28 from entering the solenoid valve 27. The annularly shaped fuel tank 22 is connected to the solenoid valve 27 by means of a fuel line 31. When the fuel from the tank 22 reaches the gas generator 28 the fuel is ignited by the igniter 29 which may be a hot-spot type lighter. Hot gases produced in the gas generator 28 are transferred to a turbine gas chamber 32 through a port 33 which communicates between the chamber 32 and gas generator 28. Connected to the turbine gas chamber 32 is a cold gas inlet valve 34. This valve may be used for cold gas check out prior to hot gas usage if desired. The cold gas would be provided by a separate source.

Any type of alternator or generator may be used in this system and the generator may be driven directly or through a suitable gearing. However, to better understand the turbo alternator of the present invention, reference is now particularly made to FIGURE 3. The alternator 23 has a housing 35 which is carried within the annular fuel tank 22. Secured to the inner surface of the housing 35 are excitation coils 36 and 37. A ferrous cap member 38 is secured to the open end of the housing 35 to provide a portion of a magnetic circuit for the magnetic field produced by the coil windings 36 and 37. The housing 35 has an end wall portion 39 which has secured thereto a bearing 40 which is provided to carry one end shaft 41 of a rotor 42. A conventional polyphase stator 46, 36 and 37 is secured in the housing 35. The rotor 42 may have segments connected to rotor windings and rotatably engaged with a pair of rotor brushes, not shown.

A turbine section 50 has a housing 51 secured to the housing 35 of the alternator 23 in such a manner as to support an end shaft 52 of the rotor 42 in a bearing 53. The housings 35 and 51 are arranged in such a manner as to provide a single enclosure for both the alternator and turbine. A turbine wheel 54 is disposed in the open end of housing 51 and secured to an intermediate portion of the end shaft 52 for rotation therewith. Due to the low temperature advantages of the pulsed system, the turbine 54 and rotor 42 may be made of one piece if desired. To prevent hot gases from the turbine from entering the area of the bearing 53 a heat barrier 55 is provided between the turbine wheel 54 and the bearing 53. To prevent a substantial quantity of hot gases from entering the alternator section 23 a baffle 56 is disposed between the open end portions of the housings 35 and 51. Therefore, during the operation of the turbine alternator, hot gases from the turbine gas chamber 32 will pass therefrom to an exhaust port 57 thereby imparting rotational movement to the turbine wheel 54 which, in turn, will rotate the armature or rotor 42 of the alternator. A tapered flange 58 and the outer surface of a coolant chamber 59 provide an annularly shaped exhaust pipe. The coolant chamber 57 may be required due to endurance or environmental requirements of certain applications. If used, it is provided with a safety relief valve 60 which will vent off high pressure gases such as steam or the like which will occur due to high temperature.

According to an important feature of the present invention the turbine alternator 21 can be stored for long periods of time without adverse effects such as loss of fuel. This is accomplished by completely sealing the fuel tank 22 with a puncturable diaphragm in the region where the fuel line 31 connects to the fuel tank 22 as indicated by reference numeral 61. To further seal the fuel tank 22 a seal is provided in an explosive type regulator valve 63 to prevent the gas within the pressurization tank 24 from entering the fuel tank 22 from passing therethrough.

When it is desired to place the turbine alternator 21 into operation, a start control signal is applied to the explosive type valve 63 thereby puncturing the seal in the valve 63 and allowing high pressure gas within pressurization tank 24 to transfer to the fuel tank 22 through the valve 63. This action will also cause the seal in the region 61 to become punctured by the increased pressure in the fuel tank 22 and allow fuel to flow through the fuel line 31 into the gas generator 28 through the normally open solenoid valve 27. The start signal which actuates the explosive type of solenoid valve 63 also provides an ignitor signal to the ignitor 29 to insure proper reaction of the fuel upon entering the gas generator 28. During the operation of the turbine alternator 21 an electronic package 66 is provided to house the necessary voltage regulator and frequency control circuits. When the output of the alternator has reached a predetermined frequency as sensed by the electronic package 66, the fuel flow to the gas generator 28 is stopped and the turbine wheel 54 and rotor 42 will continue to rotate during a coast period. A flywheel can be added to the turbine alternator to increase the time duration of the coast period.

Figure 4:
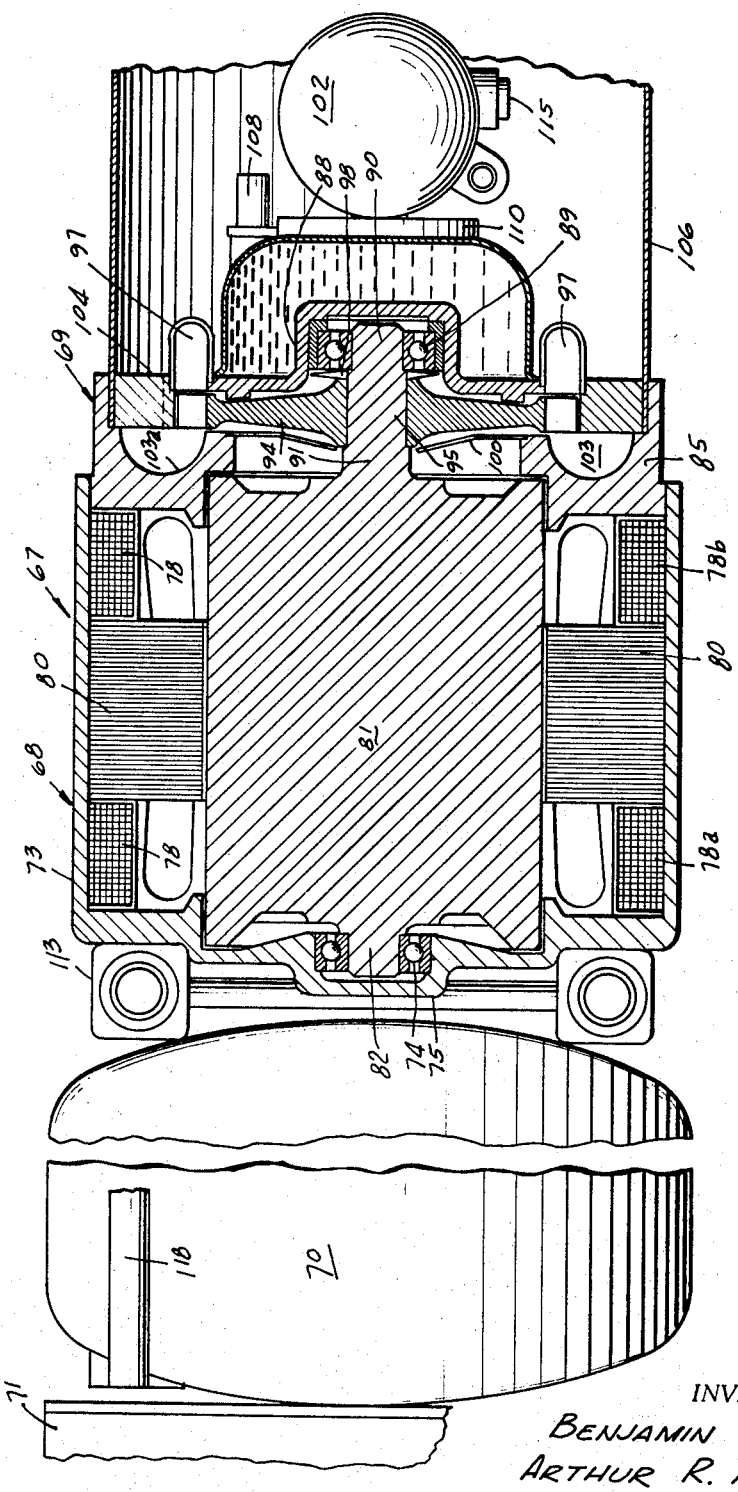
FIGURE 4 is a longitudinal cross sectional view, with parts in side elevation, of another embodiment of turbine driven alternator package according to this invention.

The system 10 of FIGURE 1 may take a modified form such as the turbine alternator shown in FIGURE 4 which is designated generally by reference numeral 67. The turbine alternator unit 67 has an alternator 68 directly coupled to turbine 69. A fuel tank 70 preferably has the same diameter as the alternator and turbine and is secured to the alternator 68 in axial alignment therewith. An electronic package 71 for controlling the output voltage and frequency of the turbine alternator is connected to the end portion of the fuel tank 70.

The alternator section 68 consists of a housing 73 having a bearing 74 carried by an end wall 75. An excitation coil 78 is disposed within the housing 73. The excitation coil 78 may comprise two coil sections 78a and 78b. A stator assembly 80 is secured between the coil sections 78a and 78b for receiving the magnetic flux field from an armature or rotor 81. The rotor 81 is provided with an end shaft 82 which is received by the bearing 74 for rotation therein. A housing end cap 85 is provided to complete the magnetic flux path to the rotor 81.

The turbine section 69 has a housing 88 which is secured to the end cap 85. The housing is provided with a bearing 89 which is axially aligned with the bearing 74. An end portion 90 of an end shaft 91 is carried by the bearing 89 for rotation therein. A turbine wheel 94 is secured to a central portion 95 of the end shaft 91 for rotation therewith. The rotor may be secured in a variety of ways, including welding. When the turbine 87 is in operation, hot gases from a turbine chamber 97 are prevented from reaching the bearing 89 by means of a heat seal 98 disposed between the turbine wheel 94 and bearing 89. To prevent hot gases from reaching the alternator section 68 of the turbine alternator 67 a baffle 100 is disposed between the rotor 81 and turbine wheel 94.

During a power period, hot gases from a gas generator 102 are applied to the turbine chamber 97 and the hot gases in the chamber 97 pass into an exhaust chamber 103 in such a manner as to impart rotational movement to the turbine wheel 94 which, in turn, provides rotational movement of the rotor 81. The hot gases in exhaust chamber 103 substantially follow the curved wall surface 103a and depart the exhaust chamber 103 through a plurality of exhaust ports such as 104 and 105. A cylindrical shield 106 serves as an exhaust pipe for the hot gases. If needed by the application, a coolant chamber 107 is secured to the housing 88 for purposes of maintaining the housing and bearing 89 therein within a predetermined operating temperature. A pressure relief valve 108 is connected to the coolant chamber 107 for the purposes of relieving high pressure vapors which accumulate within the coolant chamber during operation. An insulating pad or block 110 is provided between the gas generator 102 and coolant chamber 107 to prevent undue transfer of heat between the coolant chamber and the gas generator.

The fuel tank 70 is preferably maintained pressurized by a pressuring gas such as nitrogen. When it is desired to initiate operation of the turbine alternator 67 an explosive valve 113 receives a start signal which opens the valve 113 and allows the fuel under pressure in fuel tank 70 to flow through a normally open solenoid valve 114 and therefrom to the gas generator 102 where the fuel is ignited by an ignitor or hot squib 115.

During normal operation of the turbine alternator 67 the initially pressurized fuel tank 70 will provide a proper fuel flow to the gas generator 102. However, should it become necessary to increase the pressure in the fuel tank 70 a solid propellant gas generator 118 is connected to the fuel tank 70. Upon receiving the proper start signal, the solid propellant gas generator 118 will produce a sufficient quantity of gas to substantially increase the pressure in the fuel tank 70. By way of example, and not by way of limitation, the gas generator 118 is of the type which produces gases of approximately 300° F. The particular advantage obtained by the embodiment shown in FIGURE 4 is that the pressurization tank and pressure regulator are eliminated thereby decreasing the total volume occupied by the turbine alternator. The electronic package 71, which is similar to the electronic package 66 of FIGURE 3, is used to control the operation of the turbine alternator 67 after it has been set into operation by a start signal.

Figure 5:
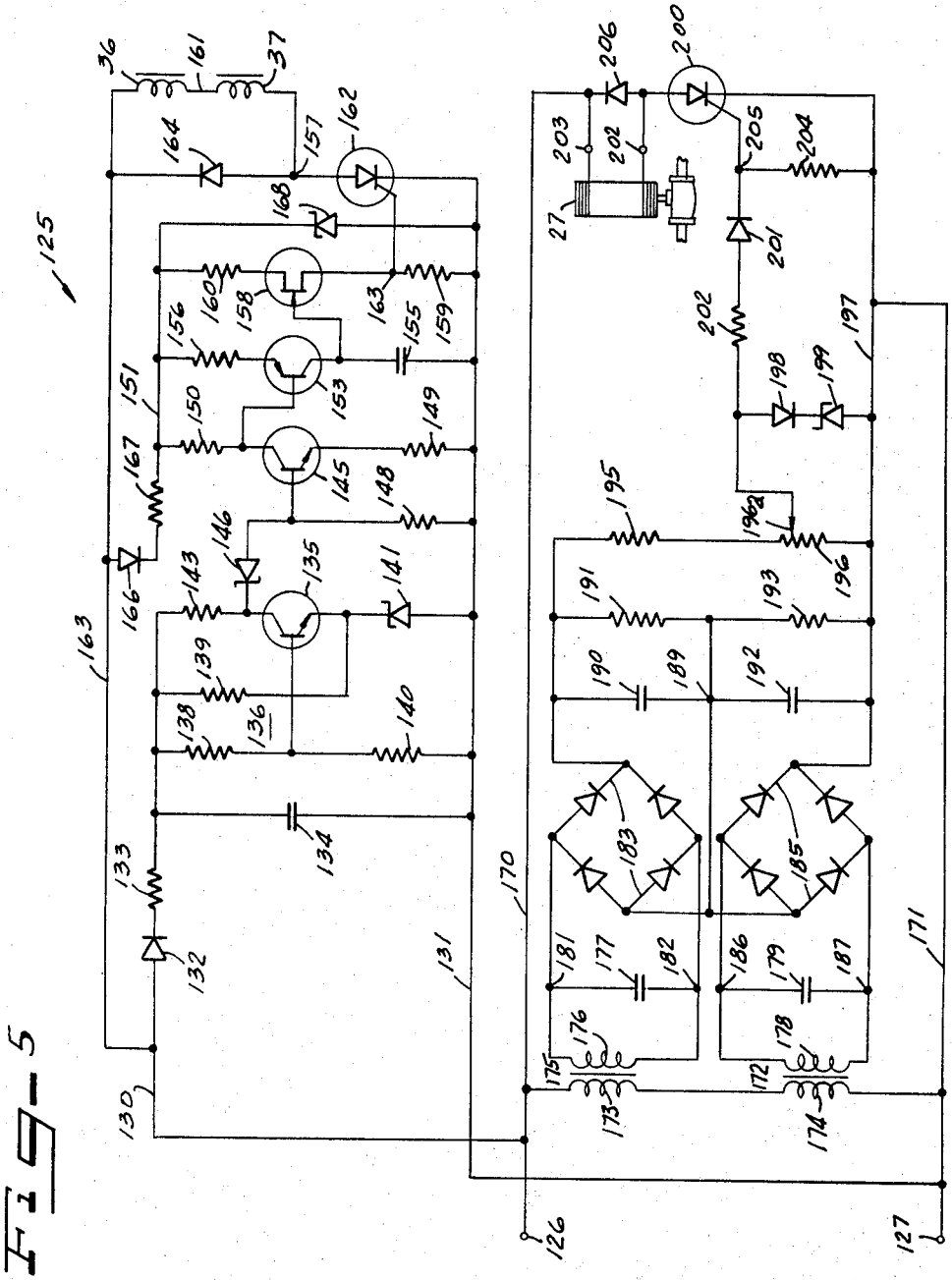
FIGURE 5 is a schematic wiring diagram of voltage and frequency control circuits used to control the operation of the alternators of FIGS. 2 and 4.

Shown in FIGURE 5 is a schematic wiring diagram of the preferred voltage regulator and speed control circuit and is generally designated by reference numeral 125. To best understand the operation of the voltage regulator and the frequency control of FIGURE 5 it will be considered in operation with the turbine alternator shown in FIGURES 2 and 3. After the turbine alternator 21 has been set into operation by a start signal, the rotating magnetic field produced by the rotor 42 will induce an alternating current into the stator 46. The voltage of the alternating current will continue to increase as the speed of the alternator increases until a predetermined voltage is sensed at terminals 126 and 127 at which time a voltage regulating signal is applied to the excitation coils 36 and 37 in such a manner as to counteract any further increase in voltage from the stator 41. Also, as the frequency of the alternating current sensed by terminals 126 and 127 increases to a predetermined value, a frequency discriminating circuit will energize the solenoid valve 27 to stop the flow of fuel from the fuel tank 22 to the gas generator 28. The voltage regulating signal applied to the coils 36 and 37 is independent of the frequency control signal applied to the solenoid valve 27.

For voltage regulation the alternating current from terminals 126 and 127 is applied to the voltage regulator circuit through lines 130 and 131. A rectifier 132 and a filter circuit consisting of resistor 133 and capacitor 134 are connected between the lines 130 and 131 to provide a D.C. signal to a bridge input circuit 136 of a transistor 135. The bridge circuit 136 consists of resistors 138, 139 and 140 and a reference diode 141. When the bridge circuit 136 is balanced, transistor 135 substantially nonconductive, current will flow through a resistor 143, a reference diode 146 and a resistor 148 to render a transistor 145 conductive. When the bridge circuit 136 is not balanced, transistor 135 conductive, the current flow through the reference diode 146 is decreased thereby decreasing the conductivity of transistor 145. The resistor 148 has one lead thereof connected intermediate the reference diode 146 and the base of transistor 145 and the other lead thereof connected to the line 131. The transistor 145 has an emitter resistor 149 which is connected to the line 131 and a collector resistor 150 which is connected to a line 151. Directly coupled to the output of transistor 145 is the base of a transistor 153. The collector of transistor 153 is connected to line 131 through a capacitor 155 while the emitter of transistor 153 is connected to line 151 through a resistor 156. The output of a transistor 153 is applied to a storage capacitor 155 and to the emitter electrode of a uni-junction transistor 158. One base of the uni-junction transistor 158 is connected to the line 131 through a resistor 159 while the other base of the uni-junction transistor 158 is connected to the line 151 through a resistor 160. Uni-junction transistor 158, resistors 159, 160 and capacitor 155 form a relaxation oscillator which is controlled primarily by the charge on capacitor 155.

A silicon control rectifier 162 has the gate electrode thereof connected to a circuit point 163 while the cathode electrode thereof is connected to the line 131. Therefore, the cathode to gate triggering current for the silicon control rectifier 162 is developed by the voltage drop across resistor 159 when the uni-junction transistor 158 is rendered conductive. The anode electrode of silicon control rectifier 162 is connected to an output terminal 157 and to one lead of the excitation coils 36 and 37. The excitation coils 36 and 37 are connected in series by a lead 151. The other lead of the excitation coils 36 and 37 is connected to the line 130 through a line 163. Connected in shunt relation to the excitation coils 36, 37 is a flyback diode 164 which serves to maintain the magnetic field induced into the excitation coils 36 and 37 for a maximum period of time after the silicon control rectifier 162 is rendered non-conductive thereby eliminating high transient voltage from being applied to the silicon controlled rectifier.

To synchronize the operation of the uni-junction transistor 158 with that of a given cycle of alternating current, the alternating current voltage is applied to the line 151 through a rectifier 166 and a resistor 167. A reference diode 168 is connected between the lines 131 and 151 to maintain a constant voltage therebetween.

During the operation of the voltage regulator circuit connected to lines 130 and 131, an increase in voltage applied to rectifier 132 will increase the D.C. potential developed across capacitor 134. During the time capacitor 134 is being charged, the bridge input circuit 136 will have equal voltage developed across each leg. However, when the potential across the capacitor 134 reaches a predetermined value determined by the reference diode 141, the voltage drop across the resistors 138, 139 and 140 will continue to increase while the voltage drop across the reference diode 141 will be maintained at a constant value. This condition will cause the current to flow between the emitter and base electrodes of transistor 125 thereby rendering the transistor 135 conductive. As the capacitor 134 continues to increase its charge the transistor 135 is rendered more conductive in a corresponding manner. The reference diode 146 insures that the signal applied to transistor 145 is maintained at the proper bias level. The transistors 145, 153 and 158 are operated from a pulsating D.C. voltage applied to the line 151 to synchronize their operation to the supply voltage applied to the SCR 162. The conductivity of transistor 145 is controlled by the signal applied from transistor 135 through reference diode 146. Since the transistor 153 is directly coupled to transistor 145 the conductivity of transistor 153 will follow in proportion to the conductivity of transistor 145 in such a manner as to vary the time required to charge capacitor 155.

By way of example, when the voltage applied between lines 130 and 131 is less than a predetermined value as determined by the reference diode 141, the bridge circuit consisting of resistors 138, 139 and 140 and the reference diode 141 is electrically in balance and the transistor 135 is maintained substantially non-conductive. This will cause the D.C. current to pass through resistor 143, reference diode 146 and resistor 148 to render the transistor 145 highly conductive during each positive half cycle applied to line 151. The high conductivity of transistor 145 will, in turn, render transistor 153 highly conductive thereby causing capacitor 155 to charge quickly. When the capacitor 155 has reached a predetermined charge as determined by the uni-junction transistor 158, the transistor 158 is rendered conductive to discharge capacitor 155 through resistor 159 which, in turn, will render the silicon controlled rectifier 162 conductive to apply a magnetizing current through the excitation coils 36 and 37 to increase the voltage output of the alternator. Therefore, when the voltage applied between lines 130 and 131 is less than the desired predetermined value, the capacitor 155 will charge quickly to render the silicon controlled rectifier 162 conductive during an early portion of the positive half of each cycle. However, when the voltage applied between lines 130 and 131 is greater than the predetermined voltage as determined by the reference diode 141, the bridge circuit consisting of resistors 138, 139 and 140 and the reference diode 141 is electrically off balance thereby causing transistor 135 to be rendered conductive. This will cause the D.C. current through resistor 143 to pass through the transistor 135 rather than the reference diode 146 to render transistor 145 less conductive in proportion to the amount of voltage exceeding the desired output voltage. The decreased conductivity of transistor 145 will, in turn, decrease the conductivity of transistor 153 thereby causing capacitor 155 to charge slowly. This will cause the silicon controlled rectifier 162 to be rendered conductive during a later portion of the positive half of each cycle to decrease the total magnetizing current through the excitation coils 37 and 38.

The polarity of the magnetic field produced by the excitation coils 36, 37 is the same as the polarity of the magnetic field produced by the rotor 42. Therefore, decreasing the magnetic field induced into the excitation coils 36, 37 will decrease the total magnetization effect of the rotor 42 which, in turn, will reduce the voltage applied to terminals 126 and 127 connected to the alternator stator 46.

To control the frequency of the alternator 21, the frequency control circuit shown in FIGURE 5 is connected to terminals 126 and 127 through lines 170 and 171 respectively. The frequency of the alternating current is developed across the primary windings 173 and 174 of transformers 175 and 172 respectively. A secondary winding 176 of transformer 175 and a capacitor 177 form a tuned circuit which is tuned above the desired frequency of the alternating current. A secondary winding 178 of transformer 172 and a capacitor 179 form a tuned circuit which is tuned below the desired frequency of the alternating current. Connected between circuit points 181 and 182 is a bridge rectifier 183 to produce a D.C. signal indicative to the energy absorbed by the tuned circuit of winding 176. In a similar manner, a bridge rectifier 185 is connected between circuit points 186 and 187 to produce a D.C. signal indicative to the frequency absorbed by the tuned circuit of secondary winding 178. The negative D.C. terminals of bridge rectifiers 183 and 185 are connected together at a common circuit point 189. Connected across the D.C. output of bridge rectifier 183 is a filter circuit consisting of a capacitor 190 and a resistor 191. A capacitor 192 and a resistor 193 are connected parallel to form a filter circuit across the D.C. output of bridge rectifier 185. Connected between the respective D.C. positive terminals of bridge rectifiers 183 and 185 is a resistor 195 and a potentiometer 196. The amplitude and polarity of the potential developed across resistor 195 and potentiometer 196 is determined by the frequency which is sensed in the tuned secondary windings 176 and 178. Connected between a movable contact 196a of potentiometer 196 and a line 197 is a blocking diode 198 which is connected in series to a reference diode 199. The reference diode 199 limits the triggering voltage applied to a silicon control rectifier 200 when a positive potential is developed between the movable contact of potentiometer 196 and line 197. On the other hand, blocking diode 198 blocks the current flow through the reference diode 199 when the potential between the movable contact and line 197 is negative. A reverse current blocking diode 201 is connected in a series with the gate electrode of circuit control rectifier 200 to prevent a reverse flow of current in the gate to cathode junction of the silicon control rectifier when the potential between the movable contact 196a and line 197 is negative. A current limiting resistor 202 is connected in the series with the gate electrode of silicon control rectifier 200 and diode 201. A resistor 204 is connected between a circuit point 205 and line 197. The anode electrode of silicon control rectifier 200 is connected to an output terminal 202 and to one lead of the solenoid valve 27, while the other lead of the solenoid valve 27 is connected to an output terminal 203 and to line 170. A transient blocking diode 206 is connected in shunt relation to the solenoid valve 27 for suppressing high inverse voltage which may otherwise be applied to the silicon control rectifier 200.

Before operation of the frequency control circuit, solenoid valve 27 is deenergized and in the normally open condition. After a start signal has been applied to the turbine alternator 21 as mentioned hereinabove, the output of alternating 21 is applied between terminals 126 and 127, which, in turn, applies alternating current to the primary windings 173, 174 of transformers 172 and 175.

As the turbine alternator continues to increase in speed, a predetermined minimum output frequency of the alternator is applied to both tuned sectionary windings 176 and 178. The tuned winding 178 which is resonant to the predetermined minimum frequency, will absorb alternating current energy from the primary winding 174 as the output frequency continues to increase through the resonant range of the tuned winding 178. On the other hand, the tuned secondary winding 176, which is resonant to a predetermined maximum frequency, will not absorb an appreciable amount of energy from the primary winding 173.

During the time the output frequency of the alternator is within the resonant frequency range of the winding 178 the alternating current energy developed in the secondary winding 178 is rectified by bridge rectifier 185 and the DC output therefrom is filtered by capacitor 192 and resistor 193. This filtered DC potential is applied between the line 197 and the circuit point 189 thereby providing a negative potential to the movable contact 196a. This negative potential will have no effect on the silicon controlled rectifier 200 and fuel flow will continue through the solenoid valve 27 at maximum rate.

The turbine alternator will continue to increase the speed until a predetermined maximum frequency is reached. The tuned secondary 176 which is resonant to the predetermined maximum frequency of the alternator, will absorb alternating current energy from the primary winding 173. The alternating current absorbed by the secondary winding 176 during the time the output frequency is within the resonant frequency of the winding 176 is rectified and filtered by bridge rectified 183 and capacitor 190, resistor 191. The filtered DC potential from rectifier 183 will provide a positive potential on the movable contact 196a which, in turn, will apply a positive potential to the gate electrode of silicon controlled rectifier 200. During this time, when the gate electrode of silicon rectifier 200 is positive, the positive cycles of alternating current applied to line 170 will cause conduction of the silicon controlled rectifier to energize the solenoid valve 27 and stop the flow of fuel to the gas generator 28.

During the coast period of the turbine alternator, the frequency applied to primary windings 173 and 174 will gradually decrease until the energy absorbed by secondary winding 176 is substantially reduced and the energy absorbed by secondary winding 178 is substantially increased. This action will cause a negative DC signal to be applied to the gate electrode of silicon controlled rectifier 200 thereby rendering the rectifier 200 non-conductive regardless of the potential applied to the anode electrode thereof, which condition, will deenergize solenoid valve 27 and allow fuel to flow to the gas generator 28. It can be seen therefore that the output frequency of the turbine alternator 21 is maintained within predetermined minimum and maximum values at a higher predetermined rotational speed halfway between the two values, by alternately energizing and deenergizing solenoid valve 27 in response to the frequency absorbed by the secondary windings 176 or 178.

The repeated alternation between the power period and coast period is best illustrated by the graphical diagram shown in FIGURE 6. The curve 210 represents the total cycle period which consists of a short power period as indicated by reference numeral 211 and a longer coast period as indicated by reference numeral 212. During the power period a full flow of fuel will enter the gas generator 15 as indicated by the rectangular wave 215 but during the coast period no fuel will enter the gas generator. The time in seconds of the power period is mathematically represented by $$t_1 = \frac{KIN\Delta N}{(HP_T - HP_L)}$$

while the time in seconds of the coast period is mathematically represented by $$t_2 = \frac{KI\Delta NN}{HP_L}$$

where

K = constant
I = inertia (ft.-lb.-sec.$^2$)
$HP_T$ = turbine horsepower
$HP_L$ = load horsepower
N = speed (r.p.m.)
$\Delta N$ = speed change (r.p.m.) as shown in FIGURE 6, $$t_T = t_1 + t_2$$

therefore solving for the horsepower relationship gives $$(4) \quad \frac{HP_L}{HP_T} = \frac{t_1}{t_T}$$

which is a very important equation in that once an optimum relationship between the power period and the total cycle period is established the relationship between the load power and the turbine power can be determined. When a given speed variation ($\Delta N$) is established as a percent ($a$) of the nominal speed such that $N = aN$, the coast period can be expressed by $$t_2 = \frac{aKIN^2}{HP_L}$$

and the power period can be expressed by $$(7) \quad t_1 = \frac{aKIN^2}{HP_T - HP_L}$$

These equations indicate that for a given load horsepower the coast time is proportional to the product of system inertia and the rotor speed squared. Therefore, the coast period can be increased to a greater extent, for a fixed speed variation, by increasing the speed rather than inertia, since it is a square function. An added advantage of using higher speed components is that system weight is reduced.

The relationships between coast power and total period with regard to load variations determine the thermodynamics and heat transfer of the cycle. Short power periods and long coast periods, for reasonable speed variations and system inertia, permit combustion at higher temperatures, thereby resulting in lower specific propellant consumption.

A particular advantage of the pulsed energy turbine system operation is in its capability in adjusting to system load variations. Since the turbine is designed to produce several times the peak load requirement, only minor system modifications are necessary to produce higher or lower alternator load capacity. This capability is especially desirable in the case where new system power requirements exceed design allowances. In this particular case, the only major system modification required would be increased propellant tank capacity.

In particular, if a major reduction in system weight and volume are needed, the pulse flow turbine can be used with bipropellants. This reduces fuel consumption by a factor of 2 or more. Tests using Aerozine 50 and nitrogen testroxide have been run on a turbine designed for monopropellant hydrazine alone and a reduction in fuel consumption of 56 percent resulted. Bipropellants also provide a restart capability since no igniter is required.

The use of monopropellants, while not achieving the low specific propellant consumption of the bipropellants, offer substantial reductions in hardware temperatures as well as improved specific propellant consumption over continuous flow power systems.

It will be understood that modifications and variations may be effected without departing from the spirit and scope of the novel concepts of the present invention.

We claim as our invention:

1. A power package comprising a turbine, power delivery means driven by the turbine, a gas producing fuel source, a gas generator receiving fuel from said source for delivering gas to said turbine, and control means sensitive to the speed of the power delivery means operating said gas generator cyclically on and off whereby the turbine is cycled through alternate driven and coasting cycles.

2. A power package comprising a turbine, power delivery means driven by the turbine, a gas producing fuel source, a gas generator receiving fuel from said source and delivering gas to said turbine, control means sensitive to the speed of the power delivery means regulating fuel flow from said source to said generator in an on-off cycle whereby the turbine is driven by hot gas pulses.

3. A power package comprising: a turbine; power delivery means driven by said turbine; a fuel source; a fuel receiving chamber having an input for receiving fuel from said source and an output connected to said turbine; igniter means in said fuel receiving chamber to ignite the fuel entering said chamber to produce a hot gas which is delivered to said turbine; an on-off valve connected between said fuel source and said fuel receiving chamber; and control means responsive to the speed of said power delivery means and connected to said on-off valve to alternately fully open and fully close said valve, whereby the turbine is cyclically operated through alternate driven and coasting cycles.

4. A power package according to claim 3 wherein said on-off valve is an electromagnetic solenoid valve.

References Cited

UNITED STATES PATENTS

| | | | |
|---|---|---|---|
| 3,002,349 | 10/1961 | Arnett et al. | 60—39.28 |
| 3,006,144 | 10/1961 | Arnett et al. | 60—39.28 |
| 3,092,960 | 6/1963 | Worley et al. | 60—39.28 XR |
| 3,289,403 | 12/1966 | Oprecht | 60—39.28 |
| 3,302,398 | 2/1967 | Taplin et al. | 60—39.28 |

JULIUS E. WEST, *Primary Examiner.*

G. SIMMONS, *Assistant Examiner.*

U.S. Cl. X.R.

290—40, 52